Patented May 14, 1946

2,400,374

UNITED STATES PATENT OFFICE 2,400,374

CONTROL MEANS FOR ANTIFRICTION BEARINGS

Alf Kristian Selnes, Detroit, Mich., assignor to Ex-Cell-O Corporation, Detroit, Mich., a corporation of Michigan Application November 3, 1943, Serial No. 508,803

6 Claims. (Cl. 308—188)

This invention relates to antifriction bearings and more particularly to a control means therefor.

In the use of antifriction bearings between relatively movable parts, difficulty has been experienced in one of the parts having a tendency to creep when it is desired to maintain the parts in a fixed position, or because of the free movement, it has been found difficult to accurately position one part with respect to another in a definite predetermined position. Often in starting the movement of one part from its position of rest it will overrun its next position of rest or the length of travel.

It is, therefore, an object of this invention to provide means for producing a predetermined drag on relatively movable parts to produce a movement of even acceleration and deceleration and to maintain the parts in fixed relative position.

Another object of the invention is to provide inexpensive means which may be easily assembled in an antifriction bearing to produce a predetermined drag on the bearing without impairing the normal function thereof.

A further object of the invention is to provide deformable members interspersed with balls or rollers in raceways between relatively movable members.

Other objects and advantages of the invention will be more fully understood from the following description taken in connection with the accompanying drawing in which.

Figure 1:
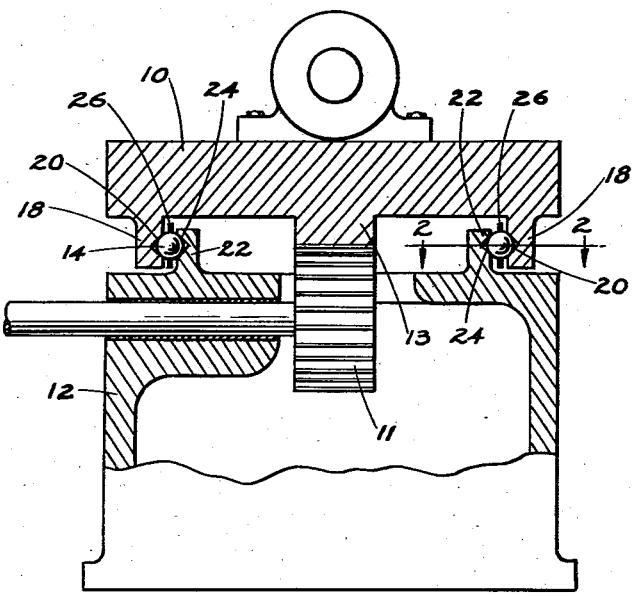
Fig. 1 is an end view, partly in section, of a machine illustrating an application of the invention by the use of balls as antifriction members in relatively movable raceways.
Figure 2:
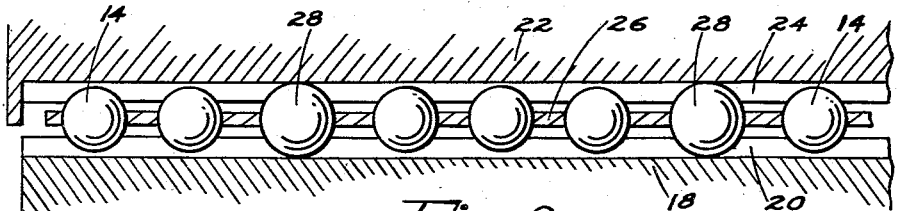
Fig. 2 is a sectional view taken on line 2—2 of Fig. 1 illustrating antifriction members in a raceway before the raceways are in contact with all of the antifriction members.
Figure 3:
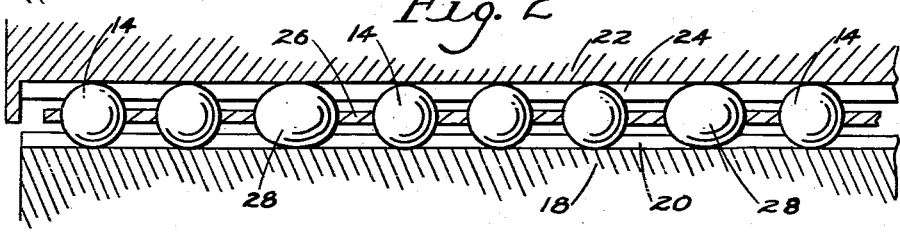
Fig. 3 is a sectional view corresponding to Fig. 2 but showing the raceways in rolling contact with certain of the antifriction members and showing others deformed.
Figure 4:
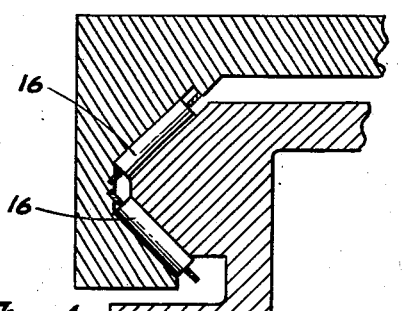
Fig. 4 is a fragmentary sectional view showing a modified form of the invention in which raceways are provided with rollers rather than balls for its antifriction members.

Referring to the drawing, the invention has been illustrated, in Figs. 1 to 3 inclusive, as applicable to raceways in relatively movable members such as a sliding table 10 on a base 12 of a machine tool. However, it is to be understood that the invention is capable of use wherever rotatable members are employed as antifriction members between relatively movable parts. For example, the rotatable members may be in the form of balls 14, as illustrated in Figs. 1 to 3 inclusive; solid or tubular rollers 16 illustrated in Fig. 4; or either ball or rollers members in a cylindrical bearing commonly used for radial or thrust loads, illustrated in Fig. 5.

In the illustrated embodiment of the invention, the sliding table 10 has oppositely disposed depending flanges 18 provided with inwardly facing raceways 20. The base 12 has oppositely disposed upright flanges 22 provided with outwardly facing raceways 24. Preferably hardened steel balls 14 are positioned between the raceways 20 and 24 in a retainer 26. The sliding table 10 is movable longitudinally of the base 12 by the engagement of rotatable pinion 11 with a rack gear 13.

Interspersed among the balls 14 and carried by the retainer 26 are deformable balls 28 having a diameter slightly larger than the diameter of the hardened balls 14. As illustrated in Fig. 2 the deformable balls 28 contact the oppositely disposed raceways before contact is made with the hardened balls 14 but when the raceways are in their operating position, resting on opposite sides of the balls 14, the deformable balls 28 are distorted by the weight of the sliding table 10 and became slightly elliptical with their minor axis normal to the plane of the raceways and their major axis parallel thereto. In addition to deforming the balls 28 slightly elliptical, the contact surfaces between the balls 28 and the raceways 20 and 24 are increased over a greater area than the point of contact on the balls 14.

As the sliding table 10 is moved relative to the base 12, the balls 14 support the load and rotate freely in the raceways. The deformable balls 28 likewise rotate but upon rotation they are constantly changing shape maintaining a deformity with their minor axis normal to the plane of the raceways 20 and 24. The force required in changing the deformity of the balls 28 has a snubbing action on the movement of the relatively movable parts.

Figure 5:
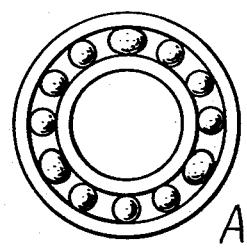
Fig. 5 is a side elevational view of a roller bearing member showing another adaptation of my invention.

Thus far the invention has been described through the use of balls, but it will be understood that rollers may be substituted for the balls and that the rollers or balls may be solid or hollow depending upon the degree of pressure required to deform the balls. Rollers 16 have been illustrated in Fig. 4. The invention is not confined to straight raceways for relatively moving parts as illustrated in Fig. 1 but may be embodied in relatively rotatable members as illustrated in Fig. 5.

The selection of the material for the deformable, rotatable members 28, and the number of deformable, rotatable members used in comparison to the number of hardened rotatable members is dependent upon the amount of snubbing action or drag required. The difference in diameter of the deformable and hardened rotatable members is also dependent upon the plasticity or deformability and the amount of snubbing action required. The larger the difference in diameter between the hardened and deformable members and the lesser degree of plasticity the more the snubbing action is increased.

As an example of material suitable for the larger and deformable members, there are a variety of cellulose and rubber compounds which may be used. A plastic-like material such as flexible phenol formaldehyde or any of the well known plastic compounds may be used. Due to the vast number of commercially available compounds which would be satisfactory for the material, it is impossible to list all suitable for such rotatable members.

It is to be understood that various changes including the size, shape and arrangement of parts may be made without departing from the spirit of my invention. The rotatable members may be solid balls or rollers, hollow balls or rollers, rotatable in straight, curved or annular raceways and it is my intention to cover, by the appended claims, such changes as may be reasonably included within the scope thereof.

I claim as my invention:

1. An antifriction bearing comprising oppositely disposed raceways on relatively movable members, hardened rotatable members of equal diameter spacing said raceways, and interspersed rotatable members of a material more deformable than said hardened rotatable members having a diameter larger than said hardened rotatable members and rotatable in said raceways.

2. An antifriction bearing comprising oppositely disposed raceways on movable members, load supporting rotatable members between said raceways, and rotatable members of a material more deformable than said load supporting members normally having a diameter greater than said load supporting members but deformable between said raceways to one dimension equal to the diameter of said load supporting members.

3. An antifriction bearing comprising oppositely disposed raceways on movable members, hardened steel rotatable load supporting members between said raceways, and rotatable members of a plastic compound more deformable than said steel rotatable members normally having a diameter greater than said load supporting members but deformable between said raceways to one dimension equal to the diameter of said load supporting members.

4. An antifriction bearing for relatively movable members comprising oppositely disposed raceways on said relatively movable members, hardened rotatable members spacing said raceways and forming a bearing between said movable members for free relative movement therebetween, and other rotatable members of a more deformable material between said opposed raceways and being slightly deformed by said raceways when said first named rotatable members are engaged by said raceways and permitting a retarding relative movement of said relatively movable members in either direction of movement of said relative movable members.

5. An antifriction bearing comprising, in combination, two relatively movable members having spaced oppositely disposed raceways extending in the direction of relative movement, a series of hardened balls interposed for rolling movement between said raceways to complete the bearing relationship and supporting the bearing load, and a plurality of rotatable elements interspersed in said series of balls also between said raceways, said elements normally being larger in size than said balls and being deformable under said bearing load in a plane normal to said raceways to the diameter of said balls, whereby in the relative movement of said members, said elements will constantly change in shape so as to impart a snubbing action or drag.

6. An antifriction bearing for relatively movable members comprising oppositely disposed raceways on said members, hardened rotatable members spacing said raceways and forming a bearing between said movable members for free relative movement therebetween, and other rotatable members of a more deformable material rotatably confined between said movable members and being slightly deformed by said movable members when said first mentioned rotatable members are engaged by said raceways and permitting a retarding relative movement of said movable members in either direction of movement of said movable members.

ALF KRISTIAN SELNES.